United States Patent
Godbout et al.

(10) Patent No.: US 11,513,294 B2
(45) Date of Patent: Nov. 29, 2022

(54) DOUBLE ASYMMETRIC OPTICAL FIBER COUPLER

(71) Applicant: Castor Optics Inc., Montréal (CA)

(72) Inventors: Nicolas Godbout, Outremont (CA); Lucas Majeau, Terrebonne (CA)

(73) Assignee: CASTOR OPTICS INC., Montreal (CA)

( * ) Notice: Subject to any disclaimer, the term of this patent is extended or adjusted under 35 U.S.C. 154(b) by 0 days.

(21) Appl. No.: 17/415,045

(22) PCT Filed: Dec. 20, 2019

(86) PCT No.: PCT/CA2019/051872
§ 371 (c)(1),
(2) Date: Jun. 17, 2021

(87) PCT Pub. No.: WO2020/124254
PCT Pub. Date: Jun. 25, 2020

(65) Prior Publication Data
US 2022/0066100 A1  Mar. 3, 2022

Related U.S. Application Data

(60) Provisional application No. 62/782,383, filed on Dec. 20, 2018.

(51) Int. Cl.
*G02B 6/28* (2006.01)
*G02B 6/02* (2006.01)

(52) U.S. Cl.
CPC ....... *G02B 6/2835* (2013.01); *G02B 6/02042* (2013.01); *G02B 6/2856* (2013.01)

(58) Field of Classification Search
CPC . G02B 6/2835; G02B 6/02042; G02B 6/2856
See application file for complete search history.

(56) References Cited

U.S. PATENT DOCUMENTS

| | | | |
|---|---|---|---|
| 4,997,248 A * | 3/1991 | Stowe | G02B 6/2835 385/43 |
| 6,434,295 B1 | 8/2002 | MacCormack et al. | |

(Continued)

FOREIGN PATENT DOCUMENTS

WO    2010057288 A1    5/2010

OTHER PUBLICATIONS

Wendy-Julie Madore et al. "Asymmetric double-clad fiber couplers for endoscopy", Optics Letters, vol. 38, No. 21, Nov. 1, 2013.

*Primary Examiner* — Ellen E Kim
(74) *Attorney, Agent, or Firm* — Reno Lessard; Norton Rose Fulbright LLP

(57) ABSTRACT

There is described an optical fiber coupler generally having: a first optical fiber having a longitudinally extending multimode guiding region and a first taper portion longitudinally extending between first and second locations of the first optical fiber, the first taper portion having a dimension progressively decreasing along a first taper direction from the first location to the second location; a second optical fiber having a longitudinally extending multimode guiding region and a second taper portion longitudinally extending between third and fourth locations of the second optical fiber, the second taper portion having a dimension progressively decreasing along a second taper direction from the third location to the fourth location; and a coupling region where at least a portion of the first taper portion is optically coupled to a portion of the second taper portion, with the first and second taper directions being opposite to one another.

23 Claims, 9 Drawing Sheets

(56) References Cited

U.S. PATENT DOCUMENTS

| | | |
|---|---|---|
| 8,792,757 B2 | 7/2014 | Boudoux et al. |
| 9,753,222 B2 | 9/2017 | Godbout et al. |
| 2004/0196537 A1 | 10/2004 | Starodoumov |
| 2007/0237453 A1 | 10/2007 | Nielsen et al. |
| 2010/0183261 A1 | 7/2010 | Gonthier et al. |
| 2012/0154783 A1 | 6/2012 | Goldberg et al. |
| 2014/0064687 A1* | 3/2014 | Hoover .............. G02B 6/02042 385/126 |
| 2015/0378105 A1* | 12/2015 | Godbout .............. G02B 6/2856 65/408 |
| 2018/0224599 A1* | 8/2018 | Bennett ................ G02B 6/0281 |

\* cited by examiner

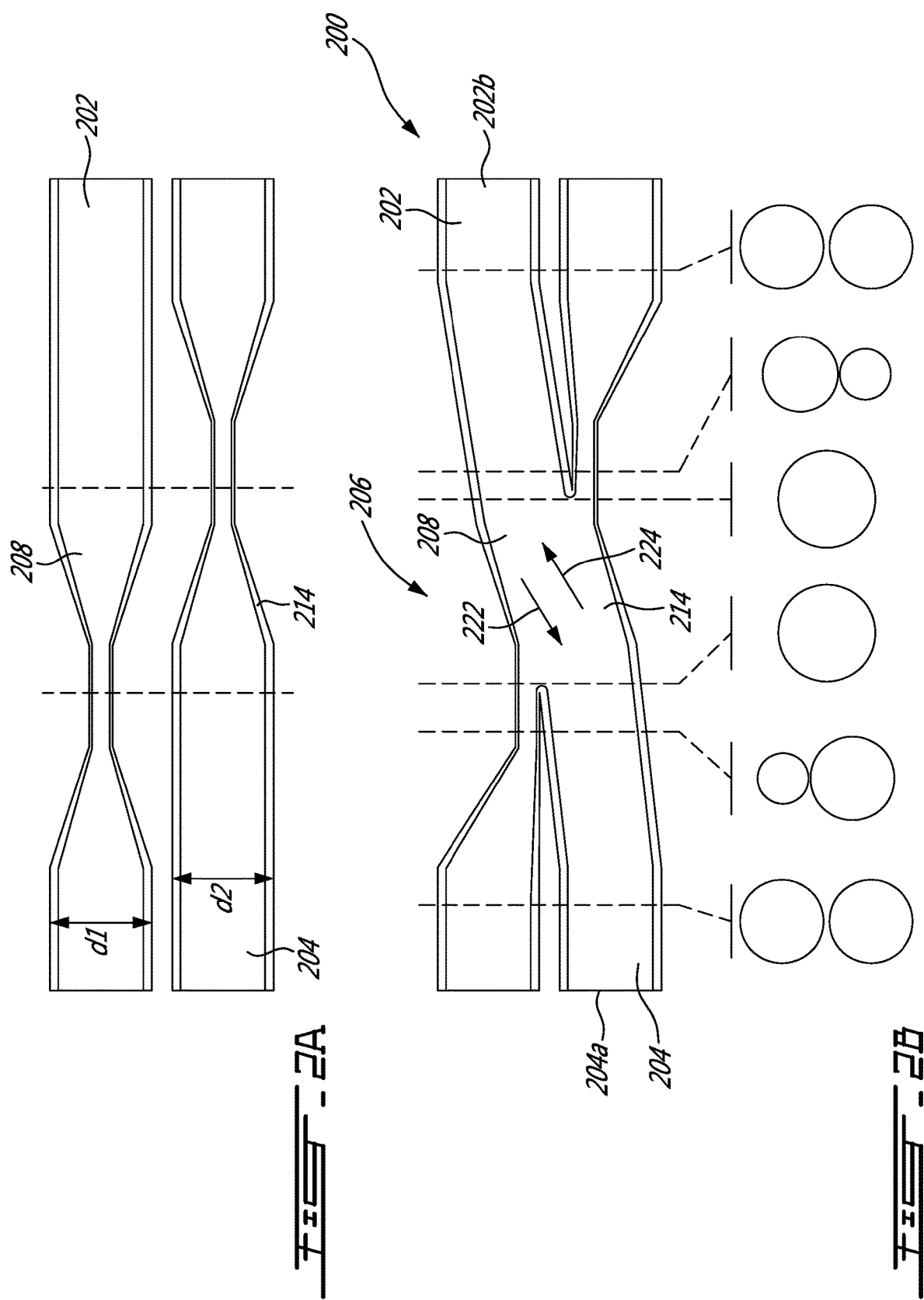

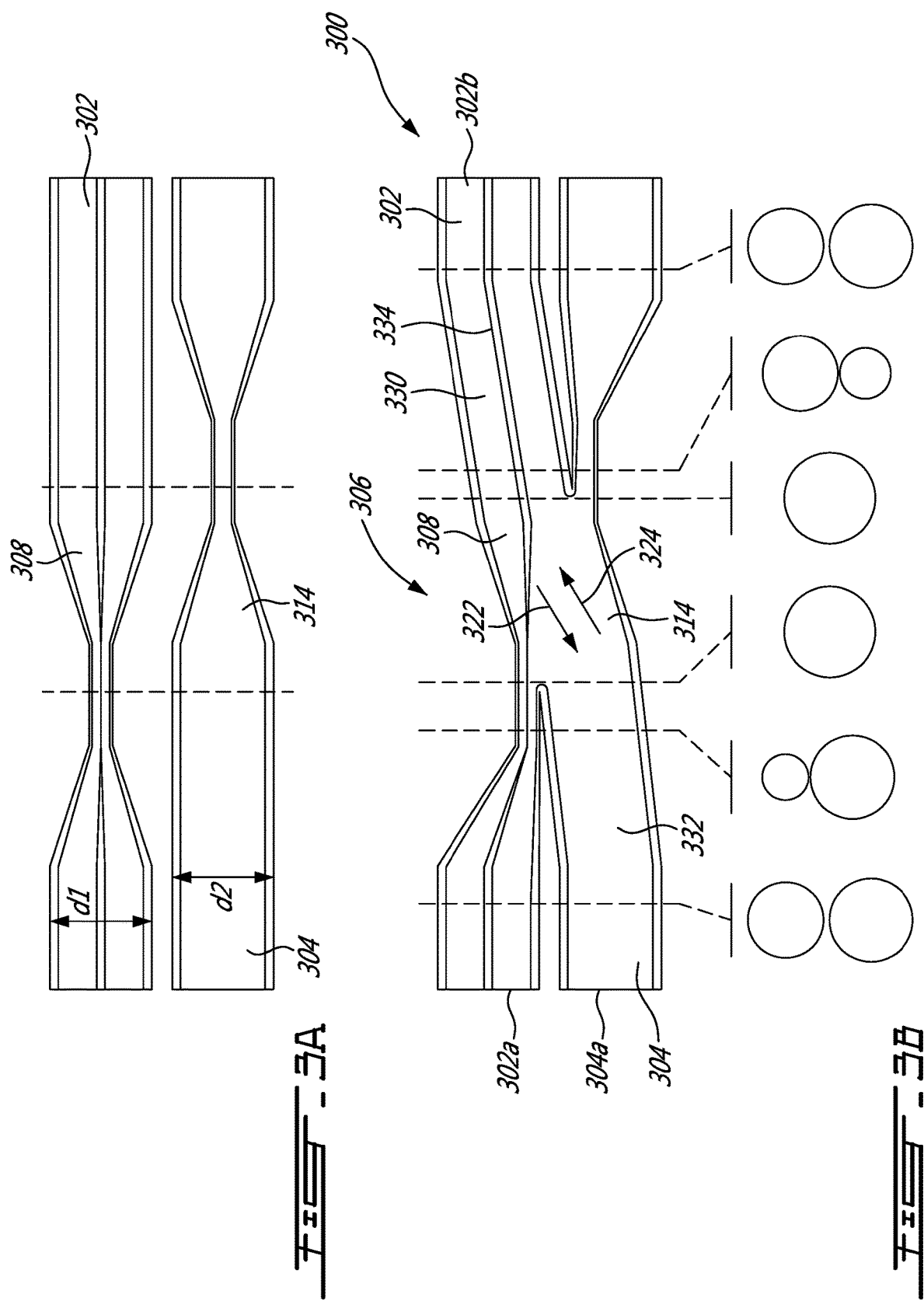

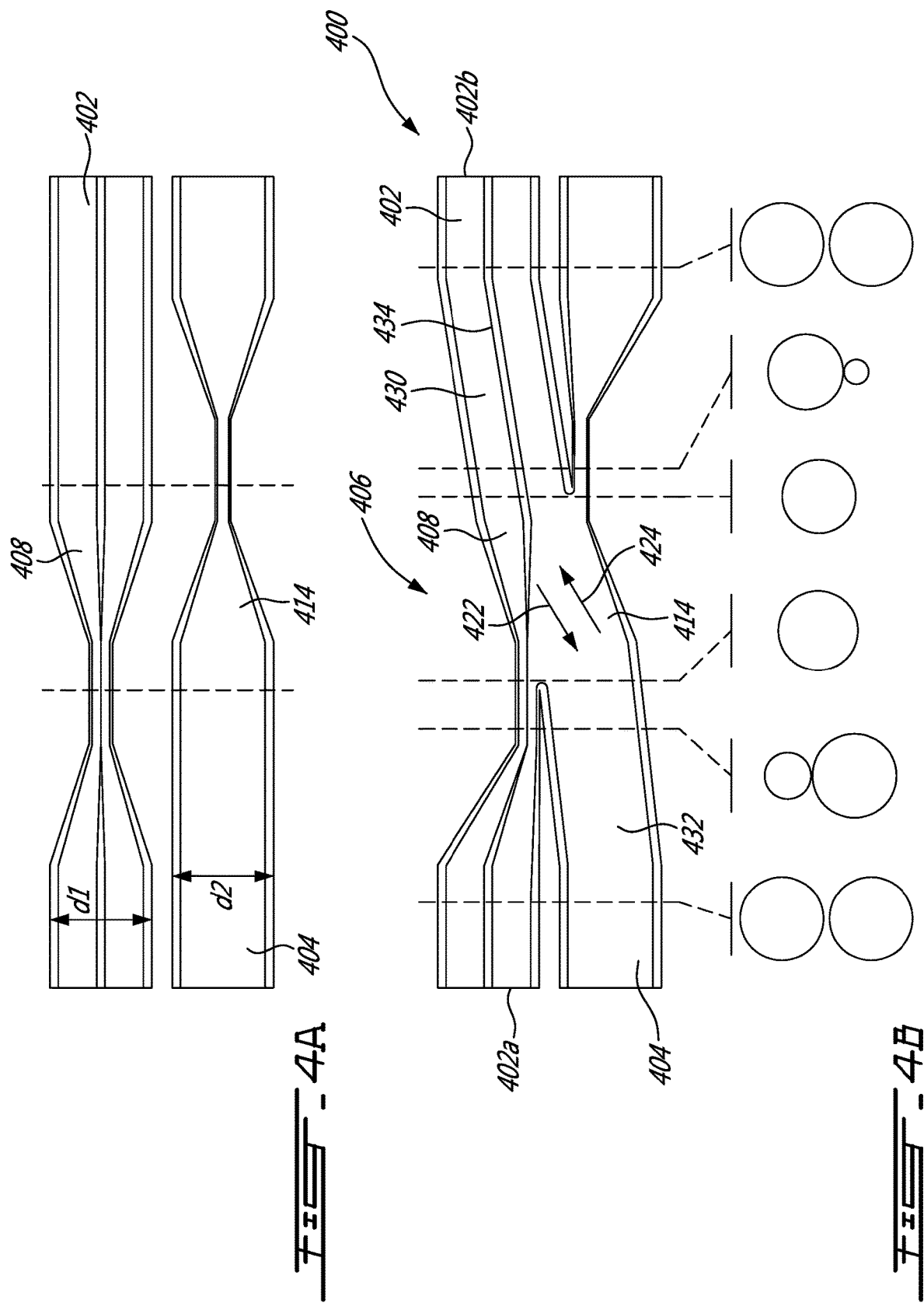

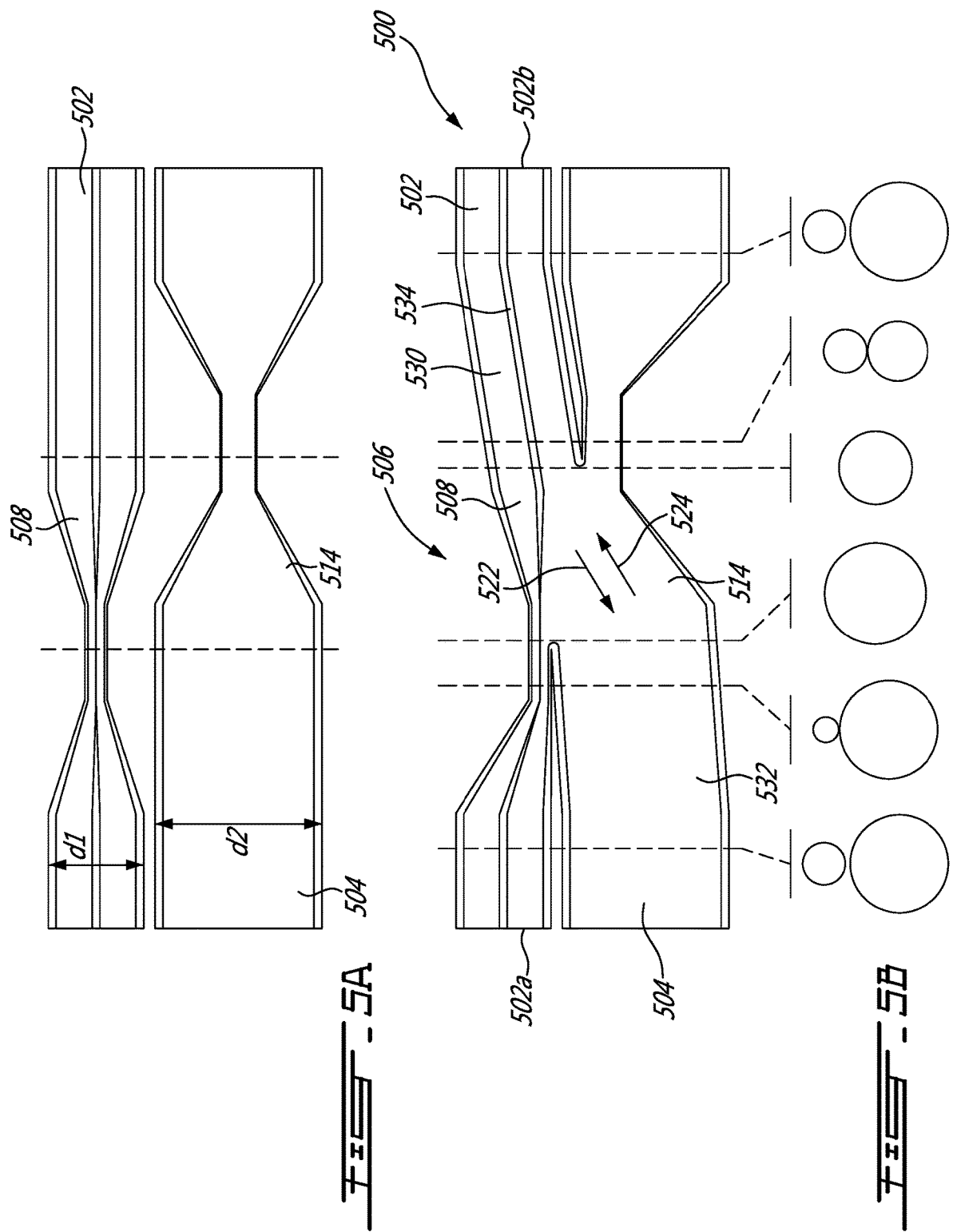

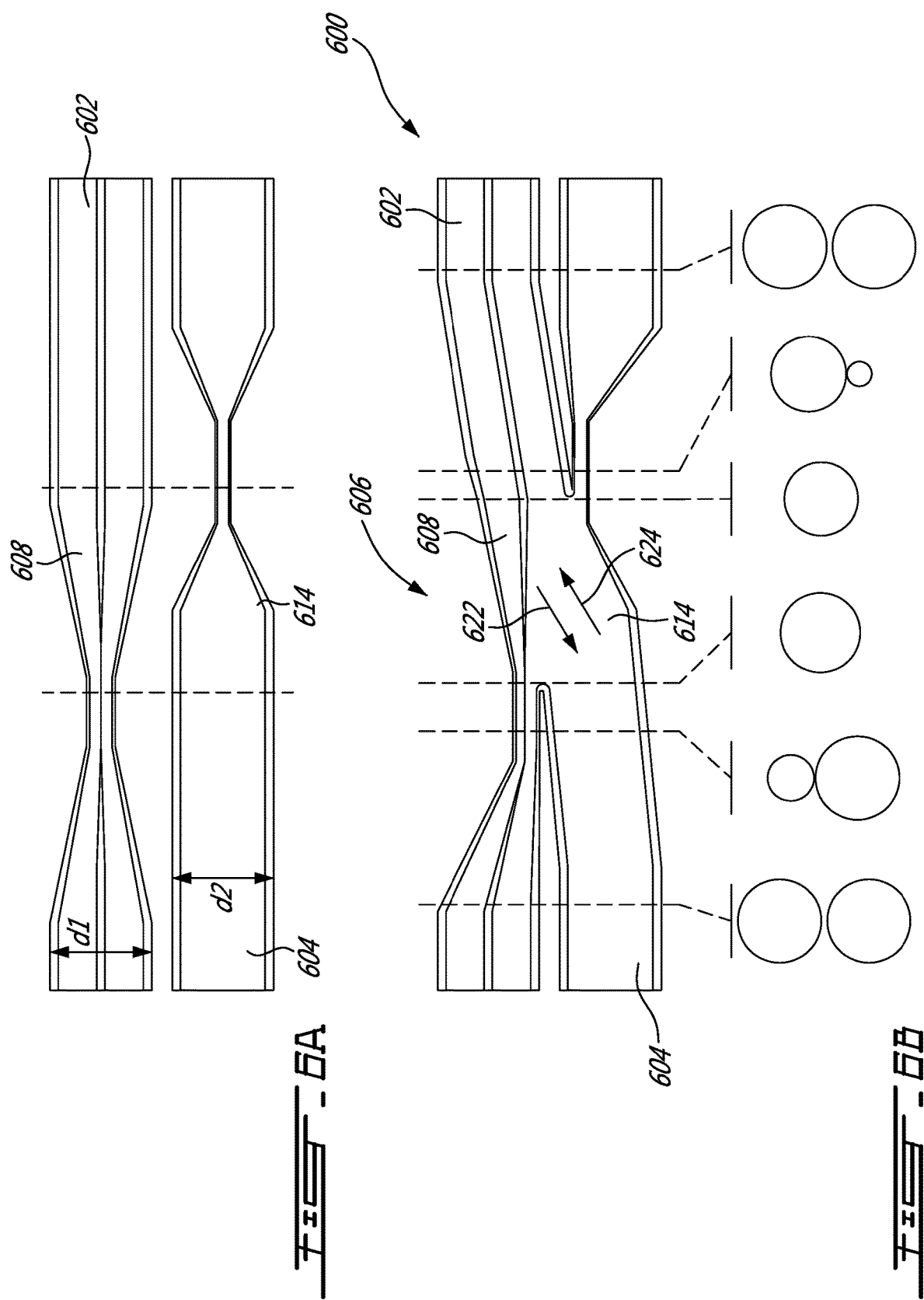

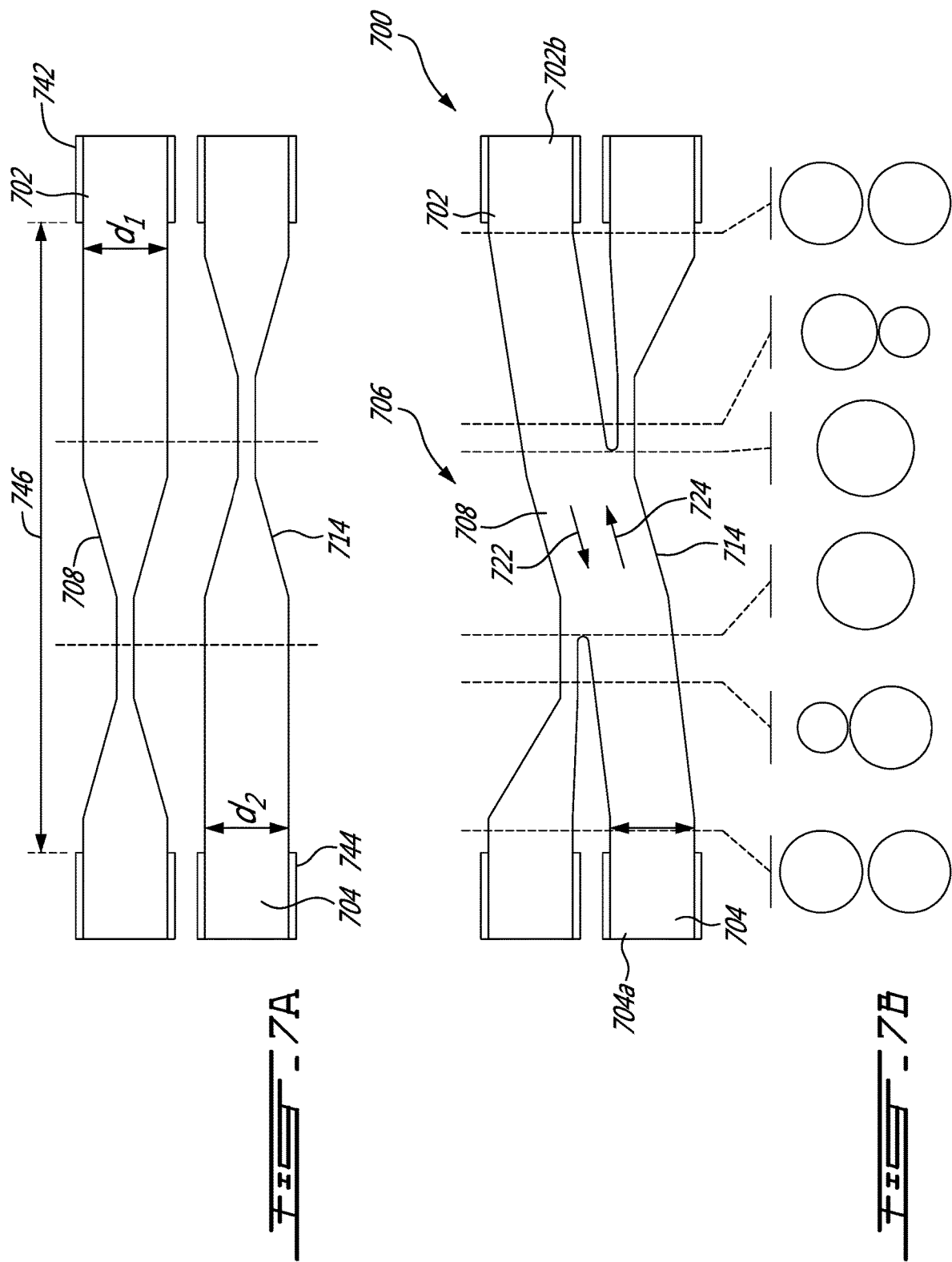

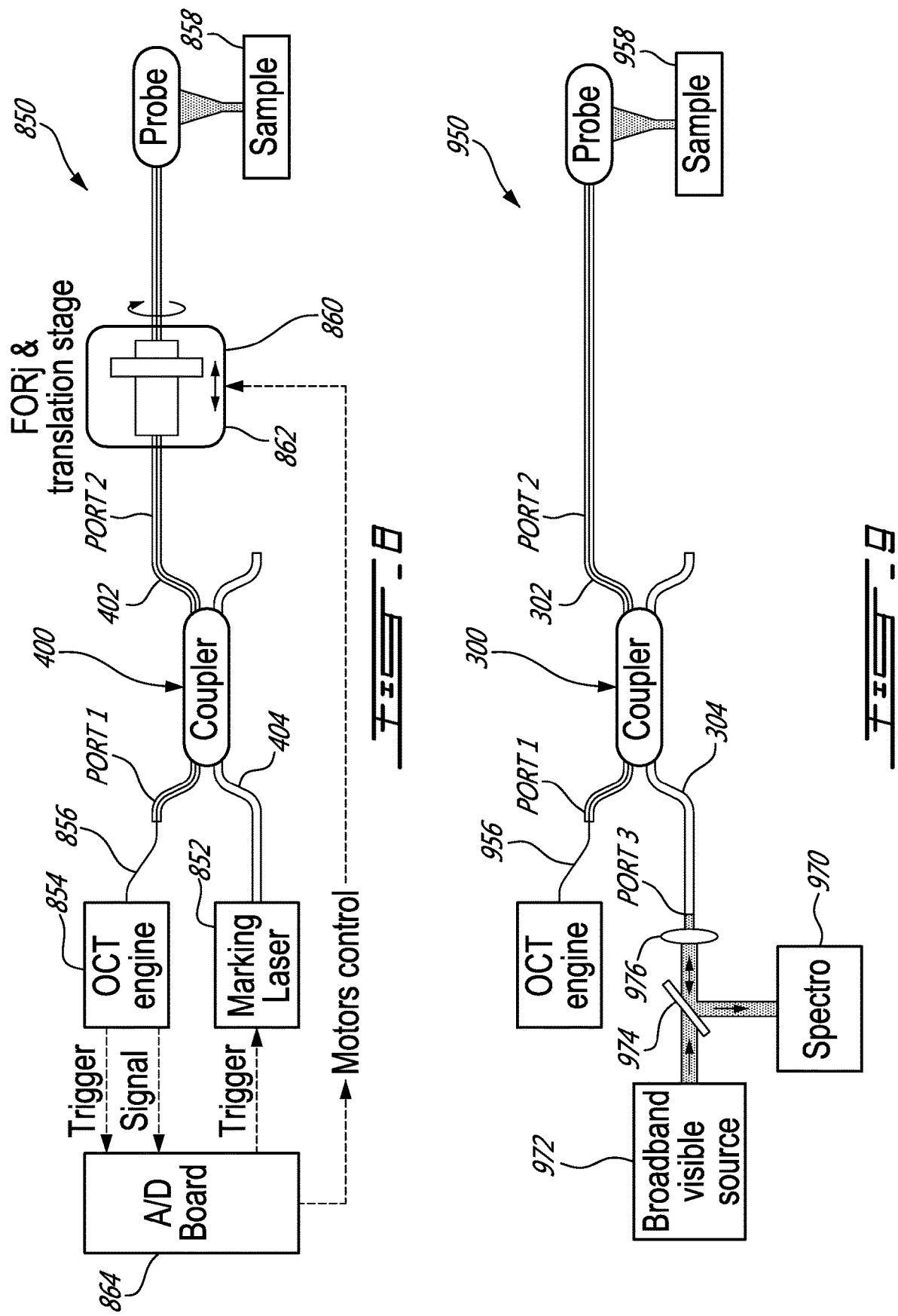

DOUBLE ASYMMETRIC OPTICAL FIBER COUPLER

FIELD

The improvements generally relate to optical fiber couplers and more particularly relate to optical fiber couplers for extraction and/or injection of multimode optical signals.

BACKGROUND

Optical fiber couplers are used in many types of imaging and/or sensing systems. Such couplers are generally fabricated by thermally fusing and/or tapering a portion of a first optical fiber to a portion of a second optical fiber, so that the light guided in their respective guiding regions interact, thus leaving four different ports.

U.S. Pat. No. 8,792,757 B2, to Boudoux et al., describes an example of a symmetrical optical fiber coupler having two double-clad optical fibers fused together and tapered. This optical fiber coupler has a first port at which a coherent illumination signal can be injected, and a second port from which the coherent illumination signal is outputted and which also collects an output optical signal comprising a coherent, single-mode component as well as a diffuse, multimode component. The first and second optical fibers have the same dimension and/or structure and therefore the optical fiber coupler is said to be symmetrical. It is known that such symmetrical optical fiber couplers have a theoretical equipartition limit which bounds the amount of the multimode component that can be extracted from the second port to a third port, or injected from the third port to the second port, to 50% of the incoming multimode signal. In fact, even achieving near or above 43% was found to be challenging.

U.S. Pat. No. 9,753,222 B2, to Godbout et al., describes an example of an asymmetrical optical fiber coupler which aims at enhancing such multimodal signal extraction and/or injection ratios. More specifically, this optical fiber coupler has a first double-clad optical fiber fused with a second optical fiber of a different dimension and/or structure in a manner that the theoretical equipartition limit discussed with reference to Boudoux et al. no longer applies. In this way, optical fiber couplers having multimodal extraction and/or injection ratios well above 50% could be obtained.

Although the existing optical fiber couplers were found to be satisfactory to a certain degree, there remains room for improvement.

SUMMARY

Optical etendue is defined as the product of the surface of the cross section of an optical fiber to its numerical aperture squared (or equivalently, the solid angle). Conservation of the optical etendue is a physical principle that applies to linear optical systems and which states that the optical etendue cannot decrease without incurring optical losses to an optical signal as it is propagated through a linear optical system. As the optical fiber couplers discussed above are linear optical systems, they are subject to the conservation of optical etendue.

With regards to the optical fiber coupler described in Boudoux et al., a multimode optical signal propagated from the second port to the third port would experience a constant optical etendue along the region where the first and second optical fibers are fused to one another. More specifically, the optical etendue at an entry location of the fused region on the first optical fiber would be similar to the optical etendue at an exit location of the fused region on the second optical fiber, as both the first and second optical fibers have the same dimension and/or structure. As such, although bound by the theoretical equipartition limit discussed above, it was found that multimodal extraction and/or injection could occur with negligible optical losses using such optical fiber couplers.

While greater multimodal extraction and/or transmission ratios could be achieved with the optical fiber coupler described in Godbout et al., the conservation of optical etendue provided by such optical fiber couplers may not have been as satisfactory. For instance, the optical etendue at an entry location of the fused region on the first optical fiber may be greater than the optical etendue at an exit location of the fused region on the second optical fiber, as the first and second optical fibers have in fact different dimension and/or structure. In such situations, optical losses could be significant.

The inventors found a way to provide an optical fiber coupler which can help achieve multimodal extraction and/or injection ratios that are greater than the theoretical equipartition limit while still achieving satisfactory optical losses.

In an aspect, there is described an optical fiber coupler having a first optical fiber with a first taper portion progressively decreasing in dimension along a first taper direction, a second optical fiber with a second taper portion progressively decreasing in dimension along a second taper direction, and a coupling region where at least a portion of the first taper portion of the first optical fiber is optically coupled to the second taper portion of the second optical fiber. When the first taper direction and the second taper direction are opposed to one another, one can expect, under given parameters of the first and second optical fibers and of the first and second taper portions, the overall form factor to be somewhat conserved along the coupling region, which can in turn contribute to the conservation of optical etendue. However, as will be understood from embodiments described in the present disclosure, the form factor needs not to be conserved along a given coupling direction to nonetheless contribute to the conservation of the optical etendue.

In accordance with a first aspect of the present disclosure, there is provided an optical fiber coupler comprising: a first optical fiber having a longitudinally extending multimode guiding region and a first taper portion longitudinally extending between a first location and a second location of the first optical fiber, the first taper portion having a dimension progressively decreasing along a first taper direction from the first location to the second location; a second optical fiber having a longitudinally extending multimode guiding region and a second taper portion longitudinally extending between a third location and a fourth location of the second optical fiber, the second taper portion having a dimension progressively decreasing along a second taper direction from the third location to the fourth location; and a coupling region where at least a portion of the first taper portion is optically coupled to at least a portion of the second taper portion, with the first taper direction being opposite to the second taper direction.

Further in accordance with the first aspect of the present disclosure, the first optical fiber can for example be a multi-clad optical fiber having a core surrounded by at least one inner cladding, in which case the at least one inner cladding of the first optical fiber can for example act as the longitudinally extending multimode guiding region of the first optical fiber.

Still further in accordance with the first aspect of the present disclosure, the second optical fiber can for example be a multi-clad optical fiber having a core surrounded by at least one inner cladding, in which case the at least one inner cladding of the second optical fiber can for example act as the longitudinally extending multimode guiding region of the second optical fiber.

Still further in accordance with the first aspect of the present disclosure, the second optical fiber can for example a multimode optical fiber having a multimode core, in which case the multimode core of the second optical fiber can for example act as the longitudinally extending multimode guiding region of the second optical fiber.

Still further in accordance with the first aspect of the present disclosure, the first optical fiber can for example be a multimode optical fiber having a multimode core, in which case the multimode core of the first optical fiber can for example act as the longitudinally extending multimode guiding region of the first optical fiber.

Still further in accordance with the first aspect of the present disclosure, the optical fiber coupler can for example have a coupling direction extending from either one of the first and second optical fibers to the other one of the first and second optical fibers, across the coupling region, wherein the coupling region has a cross section with an optical etendue being at least maintained along the coupling direction, the optical etendue being defined by an equation equivalent to the following equation: $G_i = \pi S_i (NA_i)^2$, wherein $G_i$ denotes the optical etendue of the coupling region at a longitudinal location i along the coupling direction, $S_i$ denotes a surface of a cross-section of the coupling region at the longitudinal location i, and $NA_i$ denotes a numeral aperture of the coupling region at the longitudinal location i.

Still further in accordance with the first aspect of the present disclosure, the optical etendue can for example increase along the coupling direction.

Still further in accordance with the first aspect of the present disclosure, the at least a portion of the first taper portion can for example be thermally fused to the at least a portion of the second taper portion.

Still further in accordance with the first aspect of the present disclosure, the coupling region can for example define a multimode injection direction extending from the third location of the second optical fiber to the first location of the first optical fiber, and a multimode extraction direction extending from the first location of the first optical fiber to the third location of the second optical fiber; and wherein the coupling region is configured to allow propagation of a multimode signal having substantially fully-filled launching conditions both: along the multimode injection direction with a given multimodal injection ratio; and along the multimode extraction direction with a given multimodal extraction ratio.

Still further in accordance with the first aspect of the present disclosure, a sum of the given multimodal injection ratio and of the given multimodal extraction ratio can for example be above 100%.

Still further in accordance with the first aspect of the present disclosure, a sum of the given multimodal injection ratio and of the given multimodal extraction ratio can for example be above 110%.

Still further in accordance with the first aspect of the present disclosure, a sum of the given multimodal injection ratio and of the given multimodal extraction ratio can for example be above 120%.

Still further in accordance with the first aspect of the present disclosure, a sum of the given multimodal injection ratio and of the given multimodal extraction ratio can for example be above 150%.

Still further in accordance with the first aspect of the present disclosure, both the given multimodal injection ratio and the given multimodal extraction ratio can for example be above 50%.

Still further in accordance with the first aspect of the present disclosure, both the given multimodal injection ratio and the given multimodal extraction ratio can for example be above 60%.

Still further in accordance with the first aspect of the present disclosure, both the given multimodal injection ratio and the given multimodal extraction ratio can for example be above 70%.

Still further in accordance with the first aspect of the present disclosure, the coupling region can for example be configured to impede the given multimodal injection ratio to the benefit of the given multimodal extraction ratio.

In accordance with a second aspect of the present disclosure, there is provided an optical fiber coupler comprising: a first optical fiber having a longitudinally extending multimode guiding region and a first fiber portion longitudinally extending between a first location and a second location of the first optical fiber; a second optical fiber having a longitudinally extending multimode guiding region and a second fiber portion longitudinally extending between a third location and a fourth location of the second optical fiber; and a coupling region where at least a portion of the first fiber portion is optically coupled to at least a portion of the second fiber portion, thereby defining a multimode injection direction extending from the third location of the second optical fiber to the first location of the first optical fiber, and a multimode extraction direction extending from the first location of the first optical fiber to the third location of the second optical fiber; wherein the coupling region is configured to allow propagation of a multimode signal having substantially fully-filled launching conditions both: along the multimode injection direction with a given multimodal injection ratio; and along the multimode extraction direction with a given multimodal extraction ratio.

Further in accordance with the second aspect of the present disclosure, a sum of the given multimodal injection ratio and of the given multimodal extraction ratio can for example be above 100%.

Still further in accordance with the second aspect of the present disclosure, a sum of the given multimodal injection ratio and of the given multimodal extraction ratio can for example be above 110%.

Still further in accordance with the second aspect of the present disclosure, a sum of the given multimodal injection ratio and of the given multimodal extraction ratio can for example be above 120%.

Still further in accordance with the second aspect of the present disclosure, a sum of the given multimodal injection ratio and of the given multimodal extraction ratio can for example be above 150%.

Still further in accordance with the second aspect of the present disclosure, both the given multimodal injection ratio and the given multimodal extraction ratio can for example be above 50%.

Still further in accordance with the second aspect of the present disclosure, both the given multimodal injection ratio and the given multimodal extraction ratio can for example be above 60%.

Still further in accordance with the second aspect of the present disclosure, both the given multimodal injection ratio and the given multimodal extraction ratio can for example be above 70%.

Still further in accordance with the second aspect of the present disclosure, the coupling region can for example be configured to impede the given multimodal injection ratio to the benefit of the given multimodal extraction ratio.

It is intended that the expression "taper portion" is meant to be interpreted broadly so as to include any portion of an optical fiber which progressively decreases in dimension along a given direction of the optical fiber. Example of the decreasing dimension can include, but is not limited to, a cross-section of the optical fiber, a width of the optical fiber, a thickness of the optical fiber and the like. Accordingly, in this disclosure, each taper portion has a direction which is defined as being the direction along which the dimension progressively decreases.

It was found convenient to introduce the expressions "down-taper portion" and "up-taper portion" to refer to some specific taper portions in this disclosure. However, as can be understood, what is referred to a down-taper portion from one point of view can also be referred to an up-taper portion from a different point of view. However, in this disclosure, a taper portion will be referred to either a down-taper portion or an up-taper portion depending on whether the dimension of the taper portion decreases or increases in a direction extending from left to right. For instance, a taper portion which dimension decreases from left to right will be referred to as a down-taper portion whereas a taper which dimension increases from left to right will be referred to as an up-taper portion. Of course, such terminology is to be construed broadly depending on the context in which it is used.

Many further features and combinations thereof concerning the present improvements will appear to those skilled in the art following a reading of the instant disclosure.

DESCRIPTION OF THE FIGURES

In the figures,

FIG. 2A is a schematic view of a first multimode optical fiber and a second multimode optical fiber being parallel to one another, with an up-taper portion of the first multimode optical fiber being longitudinally aligned with a down-taper portion of the second multimode optical fiber, in accordance with one or more embodiments;

FIG. 2B is a schematic view of an example of an optical fiber coupler having the first and second multimode optical fibers of FIG. 2A, with the up-taper portion of the first multimode optical fiber being optically coupled to the down-taper of the second multimode optical fiber, in accordance with one or more embodiments;

FIG. 3A is a schematic view of a double-clad optical fiber and a multimode optical fiber being parallel to one another, with an up-taper portion of the double-clad optical fiber being longitudinally aligned with a down-taper portion of the multimode optical fiber, in accordance with one or more embodiments;

FIG. 3B is a schematic view of an example of an optical fiber coupler having the double-clad optical fiber the multimode optical fiber of FIG. 3A, with the up-taper portion of the double-clad optical fiber being optically coupled to the down-taper portion of the multimode optical fiber, in accordance with one or more embodiments;

FIG. 4A is a schematic view of a double-clad optical fiber and a multimode optical fiber being parallel to one another, with an up-taper portion of the double-clad optical fiber being longitudinally aligned with a down-taper portion of the multimode optical fiber, the multimode optical fiber having a greater tapering ratio than a tapering ratio of the double-clad optical fiber, in accordance with one or more embodiments;

FIG. 4B is a schematic view of an example of an optical fiber coupler having the double-clad optical fiber and the multimode optical fiber of FIG. 4A, with the up-taper portion of the double-clad optical fiber being optically coupled to the down-taper portion of the multimode optical fiber, in accordance with one or more embodiments;

FIG. 5A is a schematic view of a double-clad optical fiber and a multimode optical fiber being parallel to one another, with an up-taper of the double-clad optical fiber being longitudinally aligned with a down-taper portion of the multimode optical fiber, the multimode optical fiber having a multimode core having a dimension greater than a dimension of an inner cladding of the double-clad optical fiber;

FIG. 5B is a schematic view of an example of an optical fiber coupler having the double-clad optical fiber and the multimode optical fiber of FIG. 5A, with the up-taper portion of the double-clad optical fiber being optically coupled to the down-taper portion of the multimode optical fiber, in accordance with one or more embodiments;

FIG. 6A is a schematic view of a double-clad optical fiber and a multimode optical fiber being parallel to one another, with an up-taper portion of the double-clad optical fiber being longitudinally aligned with and longer than a down-taper portion of the multimode optical fiber, in accordance with one or more embodiments;

FIG. 6B is a schematic view of an example of an optical fiber coupler having the double-clad optical fiber the multimode optical fiber of FIG. 6A, with the up-taper portion of the double-clad optical fiber being optically coupled to the down-taper portion of the multimode optical fiber, in accordance with one or more embodiments;

FIG. 7A is a schematic view of a first multimode optical fiber and a second multimode optical fiber being parallel to one another, showing a stripped region along which outer claddings of the first and second multimode optical fibers have been removed, in accordance with one or more embodiments;

FIG. 7B is a schematic view of an example of an optical fiber coupler having the first and second multimode optical fibers of FIG. 7A, with the up-taper portion of the first multimode optical fiber being optically coupled to the down-taper of the second multimode optical fiber, in accordance with one or more embodiments;

FIG. 8 is a schematic view of an example of a clinical system incorporating a laser marking system and an optical coherence tomography monitoring system, incorporating the optical fiber coupler of FIG. 4A, in accordance with one or more embodiments;

FIG. 9 is a schematic view of an example of a combined spectroscopy and optical coherence tomography system, incorporating the optical fiber coupler of FIG. 3B, in accordance with one or more embodiments.

DETAILED DESCRIPTION

Figure 1:
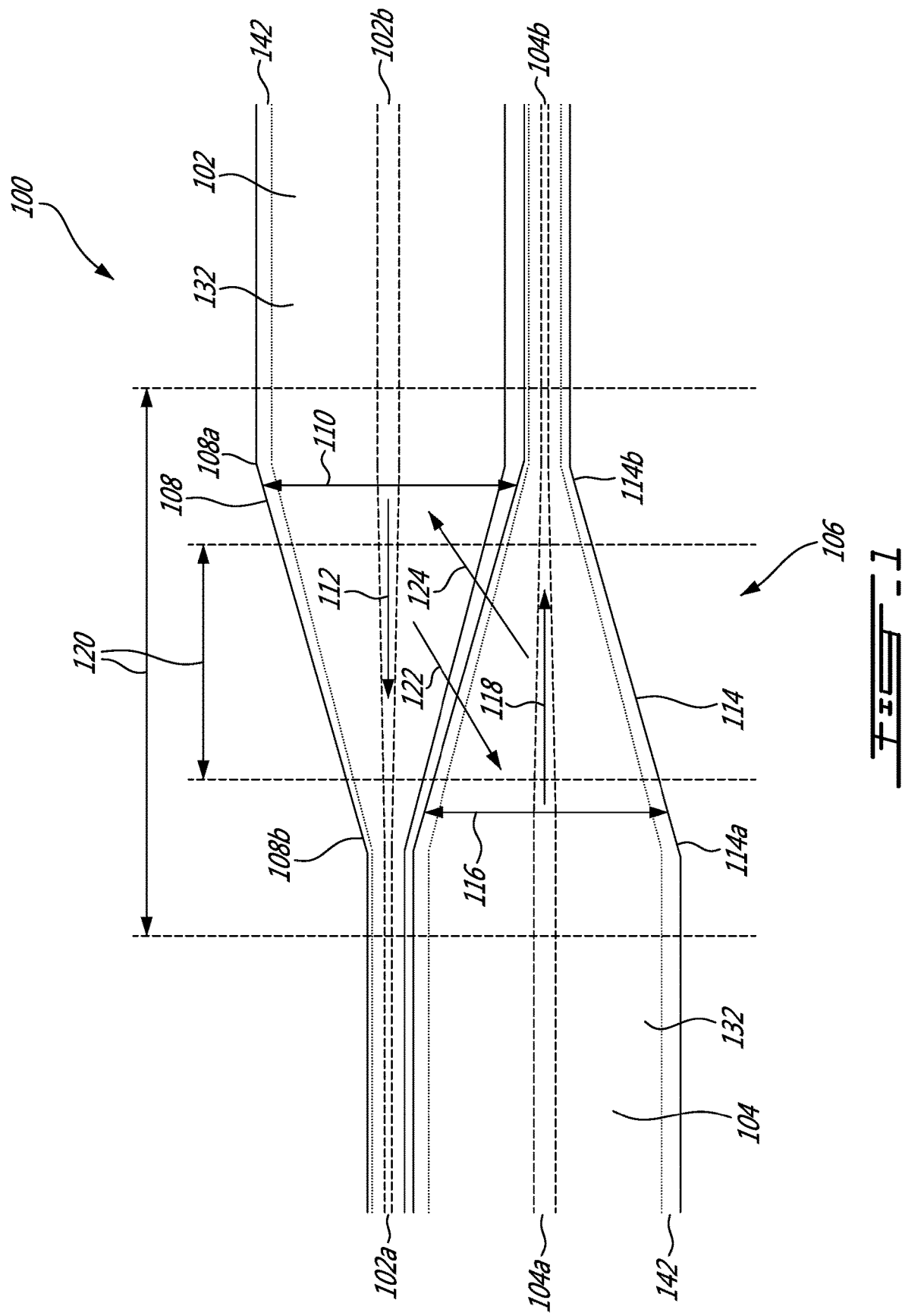
FIG. 1 is an example of an optical fiber coupler, in accordance with one or more embodiments.

FIG. 1 shows an example of an optical fiber coupler 100 having a first optical fiber 102 extending between first and second ports 102a and 102b, a second optical fiber 104 extending between third and fourth ports 104a and 104b, and a coupling region 106 where at least a portion of the first optical fiber 102 is optically coupled to at least a portion of the second optical fiber 104.

More specifically, the first optical fiber 102 has a first taper portion 108 longitudinally extending between a first location 108a and a second location 108b of the first optical fiber 102. The first taper portion 108 has a dimension 110 progressively decreasing along a first taper direction 112 from the first location 108a to the second location 108b.

The second optical fiber 104 has a second taper portion 114 longitudinally extending between a third location 114a and a fourth location 114b of the second optical fiber 104. The second taper portion 114 has a dimension 116 progressively decreasing along a second taper direction 118 from the third location 114a to the fourth location 114b.

As will be described below with reference to the figures, the coupling region 106 is such that at least a portion of the first taper portion 108 is optically coupled to at least a portion of the second taper portion 114, with the first taper direction 112 being opposite to the second taper direction 118.

In this example, the first taper portion 108 of the first optical fiber 102 is an up-taper and the second taper portion 114 of the second optical fiber 104 is a down-taper portion, and will be referred to as the up-taper 108 and the down-taper 114 in the following paragraphs.

However, as will be understood, the first taper portion 108 can be a down-taper portion while the second taper portion 114 can be an up-taper portion in some other embodiments.

As such, the coupling region 106 of the optical fiber coupler 100 has at least a portion of a down-taper belonging to either one of the first and second optical fibers 102 and 104 being optically coupled to at least a portion of an up-taper portion belonging to the other one of the first and second optical fibers 102 and 104.

As can be understood, depending on the embodiment, the coupling region 106 can have a length 120 which is longer, equal or shorter than a length of the up- and down-taper portions 108 and 114.

For instance, in some embodiments, only a fraction of the up- and down-taper portions 108 and 114 are optically coupled to one another, thus leaving the coupling region 106 with a length being below the length of the up- and down-taper portions 108 and 114.

In alternate embodiments, the coupling region 106 exceeds either one or both of the ends of the up- and down-taper portions 108 and 114, which can leave the coupling region 106 with a length which is longer than the length of the up- and down-taper portions 108 and 114.

As can be understood, depending on the embodiment, the up- and down-taper portions 108 and 114 can be longer, equal or shorter from one another.

Also, the initial diameter of the up- and down-taper portions 108 and 114 as well as the final diameter of the up- and down-taper portions 108 and 114 can be larger, equal or smaller from one another depending on the embodiment.

The skilled reader will also appreciate that the position of the up- and down-taper portions 108 and 114 can be offset such as only a portion of the up-taper will touch a portion or the totality of the down taper and vice-versa.

In some embodiments, up- and/or down-taper portions each can have a series of tapers resulting in a taper portion having one or more plateaux, and/or regions with hills and valleys.

In this example, the optical coupling 106 includes an intimate contact between the up-taper portion 108 of the first optical fiber 102 and the down-taper portion 114 of the second optical fiber 104. However, in some other embodiments, the optical coupling 106 is obtained by thermally fusing and/or tapering the up-taper portion 108 of the first optical fiber 102 to the down-taper portion 114 of the second optical fiber 104.

It is noted that both the first and second optical fibers 102 and 104 are configured to propagate at least a multimode optical signal so as to allow multimodal transfer between them. Accordingly, both of the first and second optical fibers 102 and 104 have a respective longitudinally extending multimode guiding region 132 surrounded by an outer cladding 142. In some embodiments, the outer cladding 142 can be partially or wholly removed from either one or both of the first and second optical fibers 102 and 104. Such outer cladding removal can be performed before or after tapering, depending on the embodiment.

For instance, in some embodiments, the first optical fiber 102 is a multi-clad optical fiber having a core surrounded by at least one inner cladding. In these embodiments, the inner cladding of the first optical fiber 102 acts as the longitudinally extending multimode guiding region 132 of the first optical fiber 102. In some other embodiments, the first optical fiber 102 is a multimode optical fiber having a multimode core. In these latter embodiments, the multimode core of the first optical fiber 102 acts as the longitudinally extending multimode guiding region 132 of the first optical fiber 102.

The same can be said of the second optical fiber 104. Similarly, in some embodiments, the second optical fiber 104 is a multi-clad optical fiber having a core surrounded by at least one inner cladding. In these embodiments, the inner cladding of the second optical fiber 104 acts as the longitudinally extending multimode guiding region 132 of the second optical fiber 104. In some other embodiments, the second optical fiber 104 is a multimode optical fiber having a multimode core. In these latter embodiments, the multimode core of the second optical fiber 104 acts as the longitudinally extending multimode guiding region 132 of the second optical fiber 104.

It is noted that multimodal transfer ratio can be defined as the ratio of the intensity of a multimodal signal that is transferred from the first port 102a to the fourth port 104b (or vice-versa), or from the second port 102b to the third port 104a (or vice-versa), over the initial intensity of the multimodal signal. Multimodal transfer generally encompasses multimodal extraction, by which a multimodal signal is extracted from the second port 102b to the third port 104a along an extraction direction 122 (or equivalently, from the first location 108a to the third location 114a), and multimodal injection, by which a multimodal signal is injected from the third port 104a to the second port 102b along an injection direction 124 (or equivalently, from the third location 114a to the first location 108a).

In this example, coupling directions such as the extraction and injection directions 122 and 124 can be defined as extending from either one of the first and second optical fibers 102 and 104 to the other one of the first and second optical fibers 102 and 104, across the coupling region 106. As such, it was found convenient to design the optical fiber coupler 100 so that the coupling region 106 has a cross-section with an optical etendue which is at least maintained along one or more of the possible coupling directions.

The optical etendue being defined by an equation equivalent to the following equation:

$G_i = \pi S_i (NA_i)^2$, where $G_i$ denotes the optical etendue of the coupling region 106 at a longitudinal location i along the coupling direction, $S_i$ denotes a surface of a cross-section of the coupling region 106 at the longitudinal location i, and $NA_i$ denotes a numeral aperture of the coupling region 106 at the longitudinal location i.

For instance, in a specific embodiment, the optical etendue $G_1$ of the coupling region 106 at a first longitudinal location along the extraction direction 122 direction is similar to the optical etendue $G_2$ of the coupling region 106 at a second longitudinal location longitudinally spaced-apart from the first longitudinal location along the extraction direction 122.

In this way, as discussed above, the optical losses that would experience a multimode optical signal propagating along the extraction direction 122 from the first optical fiber 102 to the second optical fiber 104 would be kept to a satisfactory level compared to a similar multimode optical signal would experience in existing optical fiber couplers.

In some embodiments, as will be detailed below, the optical etendue is not only maintained but also increased along either the extraction direction 122 or the injection direction 124.

It was found that as the optical etendue is conserved, or minimally affected, along either one or both of the extraction and injection directions 122 and 124, the optical fiber coupler 100 is not limited by a tapering ratio below a ratio of numerical apertures of the first and second multimode optical fibers 102 and 104, as could previously be inferred U.S. Patent Publication No. 2010/0183261 A1, to Gonthier et al.

Such a limitation can be demonstrated using the optical etendue equation and the conservation principle. It is first convenient to distinguish between the optical etendue of a system and the optical etendue of propagating light within a system. The optical etendue of a system is defined as the maximal optical etendue supported by a structure. For an optical fiber, the optical etendue relates to the numerical aperture (NA), which can be calculated based on the refractive indices of that optical fiber. Whereas, for propagating light, the optical etendue is related to the launched (or otherwise excited) numerical aperture herein referred to as LNA. It is therefore understood that, within an optical fiber of surface area S, $LNA \leq NA$. For launching conditions where LNA=NA, the structure is said to be fully-filled. One could also envision a structure having a variable optical etendue, which may increase and then decrease to its original value, without losses as long as the LNA is maintained.

For a first tapered optical fiber with an optical etendue $G_1$ in an untapered region and an optical etendue $G_{1T}$ in a tapered region, the conservation principle states that $G_1$ must be smaller or equal to $G_{1T}$. Therefore, the LNA of the tapered region, referred to herein as $LNA_{1T}$, will increase proportionally to a tapering ratio ITR, as can be demonstrated by the following equations:

$G_1 \leq G_{1T}$. (1)

With $G_1 = \pi S_1 (NA_1)^2$ and $G_{1T} = \pi S_{1T} (LNA_{1T})^2$, equation (1) can become:

$$\left(\frac{NA_1}{LNA_{1T}}\right)^2 \leq \frac{s_{1T}}{s_1}.$$ (2)

Using the tapering ratio definition, $$ITR_{i \to j}^2 = \frac{s_j}{s_i} \leq 1,$$

equation (2) can become:

$$\frac{NA_1}{ITR_{1 \to 1T}} \leq LNA_{1T}.$$ (3)

To transfer light from a first optical fiber to a second without losses the second optical fiber must allow propagation of all the modes of the first optical fiber. More specifically, the modes supported by an optical fiber being directly related to the numerical aperture at the coupling region, the numerical aperture of the first optical fiber should preferably be smaller or equal to the numerical aperture of the second fiber. Therefore, in the case where the first fiber is a tapered optical fiber, the launched numerical aperture of the tapered region $LNA_{1t}$ should preferably be smaller or equal to the numerical aperture of the second fiber $NA_2$. Per this constraint, the inventors have shown that the tapering ratio $ITR_{1 \to 1T}$ should preferably be greater or equal to a ratio of numerical apertures of the first $NA_1$ over the numerical aperture of the second fiber $NA_2$, as shown below:

$$\frac{NA_1}{NA_2} \leq ITR_{1 \to 1T}.$$ (4)

It is therefore possible to achieve multimode extraction and/or injection ratios which are above the ratios obtained with the existing optical fiber couplers. Example 1 presented below shows an embodiment of an optical fiber coupler that is not limited by a tapering ratio below a ratio of numerical apertures of the first and second multimode optical fibers.

Example 1

FIG. 2A shows a first multimode optical fiber 202 and a second multimode optical fiber 204 each having corresponding down- and up-taper portions. As shown, the first and second multimode optical fibers 202 and 204 are shown as they would be expected to be positioned prior to optical coupling, which includes thermal fusing in this case.

More specifically, as shown in this embodiment, the first and second multimode optical fibers 202 and 204 are parallel to one another, with an up-taper portion 208 of the first multimode optical fiber 202 being longitudinally aligned with a down-taper portion 214 of the second multimode optical fiber 204.

In this specific embodiment, the first and second multimode optical fibers 202 and 204 have an overall diameter of 125 μm and a multimode core diameter of 105 μm, with a NA of 0.22. The down- and up-taper portions of each of the first and second multimode optical fibers 202 and 204 are tapered at 30% of their initial diameters d1 and d2.

FIG. 2B shows an example of an optical fiber coupler 200 having the first and second multimode optical fibers 202 and 204. As shown, the optical fiber coupled 200 has a coupling region 206 where the up-taper portion 208 of the first multimode optical fiber 202 is thermally fused to the down-taper 214 of the second multimode optical fiber 204. Following the fusion, additional tapering of the coupling region 206 may be used, not shown in the figure, to promote mode transfer from one multimode optical fiber to the other.

As shown in this embodiment, the coupling region 206 extends over the lengths of the up-taper portion 208 of the first multimode optical fiber 202 and of the down-taper portion 204 of the second multimode optical fiber 204.

The optical fiber coupler 200 was found to exhibit a multimodal extraction ratio of 84% in an extraction direction 222 extending from the second port 202b to the third port 204a of the optical fiber coupler 200, as well as a multimodal injection ratio of 84% in an injection direction 224 extending from the third port 204a to the second port 202b of the optical fiber coupler 200. The excess loss of the optical fiber coupler 200 was found to be less than 7%, in both the extraction and injection directions 222 and 224.

It was found that an optical fiber coupler made with two identical but non-tapered multimode optical fibers fabricated based on existing techniques was limited to 43% of multimodal extraction ratio in only one coupling direction, with excess loss of 16% for non-tapered multimode optical fibers. For an optical fiber coupler made with two identical multimode optical fibers, whereby a down-taper portion of one of the multimode optical fibers is optically coupled to an un-tapered portion of the other one of the multimode optical fibers achieved only 59% of multimodal extraction ratio in only one coupling direction, with excess loss of 35%. As such, the inventors believe that such results demonstrate that the optical fiber coupler 200 described herein can achieve higher multimodal extraction and/or injection ratios in addition to enabling efficient multimode bi-directionality.

The bottom of FIG. 2B presents a cross-section of the first and second multimode optical fibers 202 and 204 at a plurality of longitudinal locations along the coupling region 206. It should be appreciated that along the extraction and injection directions 222 and 224 of the coupling region 206, the optical etendue is substantially maintained, thus contributing in reducing the optical losses as discussed above.

Example 2

FIG. 3A shows a double-clad optical fiber 302 and a multimode optical fiber 304 each having corresponding down- and up-taper portions. As illustrated, the double-clad optical fiber 302 and the multimode optical fiber 304 are shown as they would be expected to be positioned prior to optical coupling.

More specifically, in this embodiment, the double-clad optical fiber 302 and the multimode optical fiber 304 are parallel to one another, with an up-taper portion 308 of the double-clad optical fiber 302 being longitudinally aligned with a down-taper portion 314 of the multimode optical fiber 304.

In this specific example, the double-clad optical fiber 302 has an overall diameter of 125 μm, an inner cladding diameter of 105 μm, and a core diameter of 9 μm, with NAs of 0.12/0.2. The multimode optical fiber 304 has overall diameter of 125 μm and a multimode core diameter of 105 μm, with a NA of 0.22. Both the double-clad optical fiber 302 and the multimode optical fiber 304 are pre-tapered to 35% of their initial dimensions d1 and d2.

FIG. 3B illustrates an example of an optical fiber coupler 300 having the double-clad optical fiber 302 and the multimode optical fiber 304, with the up-taper portion 308 of the double-clad optical fiber 302 being thermally fused to the down-taper portion 314 of the multimode optical fiber 304.

As in the preceding example, the coupling region 306 has a length extending over the length of the up-taper portion 308 and of the down-taper portion 314.

The optical fiber coupler 300 was found to exhibit a multimode extraction ratio of 77%, meaning that 77% of a multimode signal propagated from the inner cladding 330 of the double-clad optical fiber 302 is extracted to the multimode core 332 of the multimode optical fiber 304, with 4% of excess loss. All the while, the optical fiber coupler 300 has a multimodal injection ratio of 65%, meaning that 65% of a multimode signal propagated from the multimode core 332 of the multimode optical fiber 304 is injected into the inner cladding 330 of the double-clad optical fiber 302, with 20% of excess loss. Also, it was found that a single-mode signal propagating along the core 334 of the double-clad optical fiber 302 would only experience a loss of 0.5 dB loss from the first port 302a to the second port 302b or from the first port 302b to the second port 302a of the optical fiber coupler 300.

The bottom of FIG. 3B presents a cross-section of the double-clad optical fiber 302 and of the multimode optical fiber 304 at a plurality of longitudinal locations along the coupling region 306 and beyond. It is appreciated that along the extraction and injection directions 322 and 324 of the coupling region 306, the optical etendue is substantially maintained, thus contributing in reducing the optical losses as discussed above.

Example 3

FIG. 4A depicts a double-clad optical fiber 402 and a multimode optical fiber 404 each having corresponding down- and up-taper portions. As illustrated, the double-clad optical fiber 402 and the multimode optical fiber 404 are shown as they would be expected to be positioned prior to optical coupling.

In this example, an up-taper portion 408 of the double-clad optical fiber 402 is longitudinally aligned with a down-taper portion 414 of the multimode optical fiber 414.

More specifically, the double-clad optical fiber 402 has an overall diameter of 125 μm, an inner cladding diameter of 105 μm and a core diameter of 9 μm, with NAs of 0.12/0.2. The multimode optical fiber 404 has overall diameter of 125 μm and a multimode core diameter of 105 μm, with a NA of 0.15.

As shown in this example, the multimode optical fiber 404 has a greater tapering ratio than a tapering ratio of the double-clad optical fiber 402. As such, the double-clad optical fiber 402 is tapered to 36.7% of its original dimension d1 whereas the multimode optical fiber 404 is tapered to 17.5% of its original dimension d2.

FIG. 4B shows an example of an optical fiber coupler 400 having the double-clad optical fiber 402 and the multimode optical fiber 404, with the up-taper portion 408 of the double-clad optical fiber 402 being thermally fused to the down-taper portion 414 of the multimode optical fiber 404.

The optical fiber coupler 400 was found to exhibit a multimode extraction ratio of 62.6%, meaning that 62.6% of a multimode signal propagated from the inner cladding 430 of the double-clad optical fiber 402 is extracted to the multimode core 432 of the multimode optical fiber 404, with 20% of excess loss while providing a multimodal injection ratio of 86%, meaning that 86% of a multimode signal propagated from the multimode core 432 of the multimode optical fiber 404 is injected into the inner cladding 430 of the double-clad optical fiber 402, with 4% of excess loss. Again, it was found that a single-mode signal propagating along the core 434 of the double-clad optical fiber 402 would only experience 0.5 dB of loss from the first port 402a to the second port 402b, and vice-versa, of the optical fiber coupler 400.

FIG. 4B also shows a cross-section of the double-clad optical fiber 402 and of the multimode optical fiber 404 at a plurality of longitudinal locations along the coupling region 406 and beyond. It is appreciated that the optical etendue is substantially maintained along either one of the extraction and injection directions 422 and 424, thus contributing in reducing the optical losses as discussed above.

Example 4

FIG. 5A shows a double-clad optical fiber 502 and a multimode optical fiber 504 each having corresponding down- and up-taper portions. As depicted, the double-clad optical fiber 502 and the multimode optical fiber 504 are shown as they would be expected to be positioned prior to optical coupling.

In this example, the double-clad optical fiber 502 and the multimode optical fiber 504 are parallel to one another, with an up-taper portion 508 of the double-clad optical fiber 502 being longitudinally aligned with a down-taper portion 514 of the multimode optical fiber 504.

In this specific example, the double-clad optical fiber 502 has an overall diameter of 125 µm, an inner cladding diameter of 105 µm and a core diameter of 9 µm, with NAs of 0.12/0.2. The multimode optical fiber 504 has overall diameter of 220 µm and a multimode core diameter of 200 µm, with a NA of 0.22. Both the double-clad optical fiber 502 and the multimode optical fiber 504 are pre-tapered to 36.7% of their initial dimensions d1 and d2.

FIG. 5B shows an example of an optical fiber coupler 500 having the double-clad optical fiber 502 and the multimode optical fiber 504, with the up-taper portion 508 of the double-clad optical fiber 502 being thermally fused to the down-taper portion 514 of the multimode optical fiber 504.

The optical fiber coupler 500 was found to exhibit a multimode extraction ratio of 85%, meaning that 85% of a multimode signal propagated from the inner cladding 530 of the double-clad optical fiber 502 is extracted to the multimode core 532 of the multimode optical fiber 504, with less than 1% of excess loss. Also, the optical fiber coupler 500 has a multimodal injection ratio of 22%, meaning that 22% of a multimode signal propagated from the multimode optical fiber 504 is injected into the inner cladding 530 of the double-clad optical fiber 502, with 50% of excess loss. Also, it was found that a single-mode signal propagating along the core 534 of the double-clad optical fiber 502 would only experience 0.5 dB of loss from the first port 502a to the second port 502b, and vice-versa, of the optical fiber coupler 500.

It was found that an optical fiber coupler made with similar but un-tapered optical fibers fabricated based on existing techniques could achieve a multimodal extraction ratio of 72%, with 6% of excess loss, while achieving a multimode injection ratio of 14%, with less than 15% of excess loss, which again supports the performances of the optical fiber couplers of this example.

FIG. 5B illustrates a cross-section of the optical fibers 502 and 504 at a plurality of longitudinal locations along the coupling region 506 and beyond. It is appreciated in this example that the optical etendue of the coupling region 506 is increased along the injection direction 524, which may reduce the multimode bi-directionality of the optical fiber coupler 500.

As will be discussed below, the optical fiber couplers presented herein have been found to be particularly useful in biomedical fiber-based imaging and/or sensing systems. For instance, the optical fiber couplers can be conveniently used in endoscopy, optical coherence tomography, fluorescence imaging, diffuse optical spectroscopy, Raman spectroscopy, confocal microscopy, confocal endomicroscopy, laser coagulation, laser ablation, or any combination thereof.

Example 5

FIG. 6A depicts a double-clad optical fiber 602 and a multimode optical fiber 604 each having corresponding down- and up-taper portions. As illustrated, the double-clad optical fiber 602 and the multimode optical fiber 604 are shown as they would be expected to be positioned prior to optical coupling.

In this example, an up-taper portion 608 of the double-clad optical fiber 602 is longitudinally offset with respect to a down-taper portion 614 of the multimode optical fiber 614. As shown, the up-taper portion 608 is longer than the down-taper portion 614 in this example.

More specifically, the double-clad optical fiber 602 has an overall diameter of 125 µm, an inner cladding diameter of 102 µm and a core diameter of 4 µm, with NAs of 0.19/0.24. The multimode optical fiber 604 has overall diameter of 125 µm and a multimode core diameter of 105 µm, with a NA of 0.22.

As shown in this example, the multimode optical fiber 604 has a greater tapering ratio than a tapering ratio of the double-clad optical fiber 602. As such, the double-clad optical fiber 602 is tapered to 48% of its original dimension d1 whereas the multimode optical fiber 604 is tapered to 17.5% of its original dimension d2.

FIG. 6B shows an example of an optical fiber coupler 600 having the double-clad optical fiber 602 and the multimode optical fiber 604, with the up-taper portion 608 of the double-clad optical fiber 602 being thermally fused to the down-taper portion 614 of the multimode optical fiber 604.

The optical fiber coupler 600 was found to exhibit multimode optical properties similar to that of the optical fiber coupler 400 described with reference to Example 3. However, due to the double-clad optical fiber 602 single-mode adiabatic sensibility, the up-taper portion 608 of the double-clad optical fiber 602 had to be smoother, which was achieved by increasing the length and tapering ratio.

FIG. 6B also shows a cross-section of the double-clad optical fiber 602 and of the multimode optical fiber 604 at a plurality of longitudinal locations along the coupling region 606 and beyond. It is appreciated that the optical etendue is substantially maintained along either one of the extraction and injection directions 622 and 624, thus contributing in reducing the optical losses as discussed above.

Example 6

FIG. 7A shows a first multimode optical fiber 702 and a second multimode optical fiber 704 each having corresponding down- and up-taper portions. As shown, the first and second multimode optical fibers 702 and 704 each have a stripped region 746 where their outer cladding 742 and 744 are removed before the down- and up-taper portions. The first and second multimode optical fibers 702 and 704 are shown as they would be expected to be positioned prior to optical coupling, which includes thermal fusing in this case. As depicted, the down-taper portion of the first multimode optical fiber 702 is adjacent a stripped portion of the second multimode optical fiber 704 whereas the up-taper portion of the second multimode optical fiber 704 is adjacent a stripped portion of the first multimode optical fiber 702.

More specifically, as shown in this embodiment, the first and second multimode optical fibers 702 and 704 are parallel to one another, with an up-taper portion 708 of the first multimode optical fiber 702 being longitudinally aligned with a down-taper portion 714 of the second multimode optical fiber 704.

In this specific embodiment, the first and second multimode optical fibers 702 and 704 have an overall diameter of 125 μm and a multimode core diameter of 105 μm, with a NA of 0.22. Portions of the outer claddings 742 and 744 are removed within the stripped region 746 so the first and second multimode optical fibers 702 and 704 have an initial diameter of 105 μm in this region. The down- and up-taper portions of each of the first and second multimode optical fibers 702 and 704 are tapered at 30% of their initial diameters d1 and d2.

FIG. 7B shows an example of an optical fiber coupler 700 having the first and second multimode optical fibers 702 and 704. As shown, the optical fiber coupled 700 has a coupling region 706 where the up-taper portion 708 of the first multimode optical fiber 702 is thermally fused to the down-taper portion 714 of the second multimode optical fiber 704. Following the fusion, additional tapering of the coupling region 706 may be performed (not shown) to promote mode transfer from one multimode optical fiber to the other.

As shown in this embodiment, the coupling region 706 extends over the lengths of the up-taper portion 708 of the first multimode optical fiber 702 and of the down-taper portion 714 of the second multimode optical fiber 704.

In view of the above-described examples, the inventors found that such optical fiber couplers could exhibit satisfactory performances depending on the embodiment. For instance, the optical fiber coupler can be designed such that the sum of the multimodal injection ratio and of the multimodal extraction ratio can be above 100%, preferably above 110%, more preferably above 120%, and most preferably above 150% in some embodiments. Moreover, in alternate embodiments, the optical fiber coupler can be designed such that both the multimodal injection ratio and the multimodal extraction ratio are above 50%, preferably above 60%, and most preferably above 70%. It is appreciated that, depending on the embodiments or the intended application, the coupling region can be configured to impede the multimodal injection ratio to the benefit of the given multimodal extraction ratio, or vice versa.

The following presents exemplary applications in which one or more of the above-described optical fiber couplers can be advantageously used. The following applications are meant to be examples only, as the optical fiber coupler in accordance with the present disclosure can be used in other applications as well.

Example Application 1

FIG. 8 shows an exemplary system 850 incorporating both a laser marking system 852 and an optical coherence tomography (OCT) monitoring system 854. The illustrated system 850 is a clinical system suited for endoluminal endoscopy, such as gastroscopy or colonoscopy, and allows for real-time monitoring of thermal effects in vivo.

As shown, the system 850 has an optical fiber coupler corresponding to the optical fiber coupler 400 described and illustrated with reference to FIG. 4B. In this example, the optical fiber coupler 400 is used to efficiently inject a multimode signal into the inner cladding of the double clad optical fiber 402 from the multimode optical fiber 404.

As shown, the OCT monitoring system 854 may have, for example, a wavelength-swept laser, a single-mode fiber-based interferometer, and a detection module. The single-mode sample arm fiber 756 is connected (e.g., spliced) to Port 1 of the optical fiber coupler 400 to propagate the OCT signal up to the sample 858. Port 2 of the optical fiber coupler 400 is connected to a fiber optics rotary joint (FORJ) 860, setup on a longitudinal translation stage 862, allowing for helical scanning of the fiber optics probe. Alternatively, a micro-motor could be used distally. Back-scattering light from the sample 858 is collected back by the single-mode core of the double-clad optical fiber 404, propagates through the optical fiber coupler 400 and back to the OCT monitoring system 854 for detection. Minimal single-mode loss of the optical fiber coupler 400 is therefore critical for high-sensitivity OCT imaging.

To enable a robust and efficient coupling of the marking laser into the inner cladding of the double clad optical fiber 404, the optical fiber coupler 400 is used. This allows for a clinically-compatible setup and does not require the use of free space optics, which may be lossy, cumbersome, and prone to misalignment in at least some situations.

The OCT monitoring system 854 and the laser-marking system 852 are interfaced with an A/D board 864 for triggering and signal acquisition. The A/D board 864 can also perform motor control as may be appreciated by the skilled reader.

Example Application 2

FIG. 9 shows an example of a spectroscopic OCT system 950, in accordance with an embodiment. The illustrated optical fiber coupler corresponds to the optical fiber coupler 300 of FIG. 3B used as a bi-directional multimode coupler to enable single-fiber illumination and detection of a spectroscopic signal. As shown in this example, the fiber output 956 of the spectroscopic OCT system 950 is spliced directly to Port 1 of the double-clad fiber coupler 300. Port 2 is used to interface with the imaging or sensing optics. Such optics may consist in a prism mounted on a micro-mirror, a prism and GRIN lens assembly, or other depending on the application. OCT signal back-reflected by the sample 958 is collected back by the fiber core of the double-clad optical fiber 302 and transmitted to a detection module 970 of the spectroscopic OCT system 950.

In this example, light from a broadband visible source 972 is coupled into the multimode optical fiber 304 at Port 3 using free space optics (e.g., beam splitter 974 and lens/objective 976) and injected within the inner-cladding of the double-clad optical fiber 302 the optical fiber coupler 300. Visible light back-scattered by the sample 958 and collected by the inner cladding goes through the optical fiber coupler 300 and is transferred to Port 3. The beam splitter 974 is used to reflect the signal to the detection module 970 which is provided in this example in the form of a spectrometer.

As can be understood, this embodiment can be used to combine OCT with diffuse spectroscopy, white-light spectroscopy or hyperspectral imaging, as need may dictate.

Example Application 3

Figure 10:
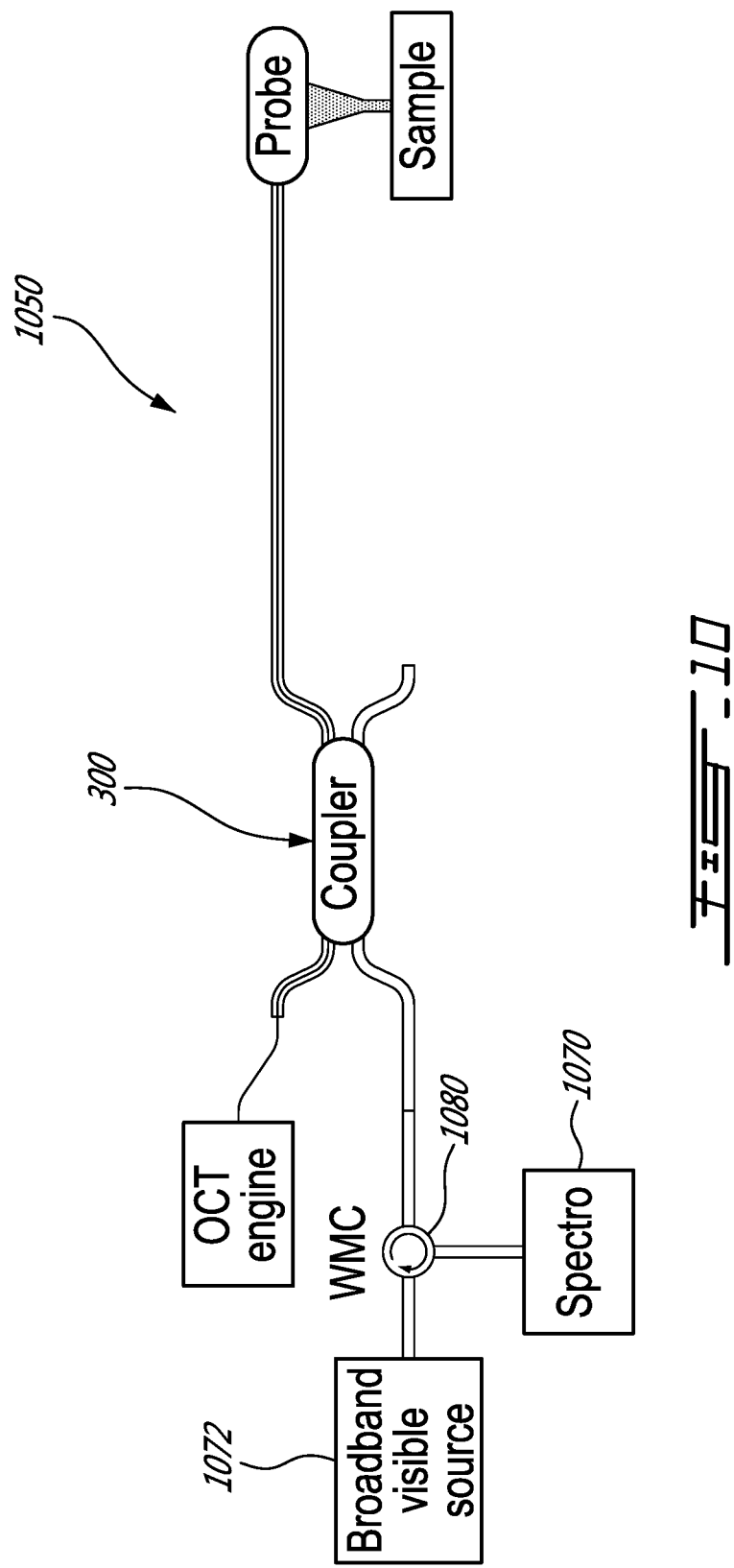
FIG. 10 is a schematic view of an example of a spectroscopic optical coherence tomography system, incorporating the optical fiber coupler of FIG. 3B, shown with a wideband multimode circulator, in accordance with one or more embodiments.

FIG. 10 shows a system 1050 similar to the one shown in FIG. 9, but the free space optics used to couple/decouple illumination and detection signals is replaced by a wideband multimode circulator (WMC) 1080. The WMC 1080 efficiently transmits light from the light source 1072 to the optical fiber coupler 300, and efficiently transfer light back from the optical fiber coupler 300 towards the detection module 1070. This setup allows for a robust all-fiber solution to combine OCT and spectroscopy.

As can be understood, the examples described above and illustrated are intended to be exemplary only. For instance, although the optical fiber couplers described with reference to the figures have two optical fibers coupled to one another, resulting in four distinct optical ports, it is encompassed that the optical fiber couplers described herein can be integrated in one or more other optical fiber couplers, or even optically coupled to one or more other multimode optical fibers or multi-clad optical fibers, which can result in more than four distinct optical ports. As such, the optical fiber couplers described herein are not limited to only two optical fibers being optically coupled to one another. Additionally, the optical fiber couplers described in this disclosure can be used in non-biomedical fields such as light detection and ranging (or Lidar), single-mode and multimode-based telecommunications, gas sensing, spectroscopy, etc. The scope is indicated by the appended claims.

What is claimed is:

1. An optical fiber coupler comprising:
a first optical fiber having a longitudinally extending multimode guiding region and a first taper portion longitudinally extending between a first location and a second location of the first optical fiber, the first taper portion having a dimension progressively decreasing along a first taper direction from the first location to the second location;
a second optical fiber having a longitudinally extending multimode guiding region and a second taper portion longitudinally extending between a third location and a fourth location of the second optical fiber, the second taper portion having a dimension progressively decreasing along a second taper direction from the third location to the fourth location; and
a coupling region where at least a portion of the first taper portion is optically coupled to at least a portion of the second taper portion, with the first taper direction being opposite to the second taper direction, with a coupling direction extending from either one of the first and second optical fibers to the other one of the first and second optical fibers, across the coupling region, the coupling region having a cross section with an optical etendue being at least maintained along the coupling direction, the optical etendue being defined by the equation $G_i = \pi S_i (NA_i)^2$, wherein $G_i$ denotes the optical etendue of the coupling region at a longitudinal location i along the coupling direction, $S_i$ denotes a surface of a cross-section of the coupling region at the longitudinal location i, and $NA_i$ denotes a numeral aperture of the coupling region at the longitudinal location i.

2. The optical fiber coupler of claim 1 wherein the first optical fiber is a multi-clad optical fiber having a core surrounded by at least one inner cladding, the at least one inner cladding of the first optical fiber acting as the longitudinally extending multimode guiding region of the first optical fiber.

3. The optical fiber coupler of claim 2 wherein the second optical fiber is a multi-clad optical fiber having a core surrounded by at least one inner cladding, the at least one inner cladding of the second optical fiber acting as the longitudinally extending multimode guiding region of the second optical fiber.

4. The optical fiber coupler of claim 2 wherein the second optical fiber is a multimode optical fiber having a multimode core, the multimode core of the second optical fiber acting as the longitudinally extending multimode guiding region of the second optical fiber.

5. The optical fiber coupler of claim 1 wherein the first optical fiber is a multimode optical fiber having a multimode core, the multimode core of the first optical fiber acting as the longitudinally extending multimode guiding region of the first optical fiber.

6. The optical fiber coupler of claim 5 wherein the second optical fiber is a multi-clad optical fiber having a core surrounded by at least one inner cladding, the at least one inner cladding of the second optical fiber acting as the longitudinally extending multimode guiding region of the second optical fiber.

7. The optical fiber coupler of claim 5 wherein the second optical fiber is a multimode optical fiber having a multimode core, the multimode core of the second optical fiber acting as the longitudinally extending multimode guiding region of the second optical fiber.

8. The optical fiber coupler of claim 1 wherein the optical etendue increases along the coupling direction.

9. The optical fiber coupler of claim 1 wherein the at least a portion of the first taper portion is thermally fused to the at least a portion of the second taper portion.

10. The optical fiber coupler of claim 1
wherein the coupling region defines a multimode injection direction extending from the third location of the second optical fiber to the first location of the first optical fiber, and a multimode extraction direction extending from the first location of the first optical fiber to the third location of the second optical fiber; and
wherein the coupling region is configured to allow propagation of a multimode signal having substantially fully-filled launching conditions both:
along the multimode injection direction with a given multimodal injection ratio; and
along the multimode extraction direction with a given multimodal extraction ratio.

11. The optical fiber coupler of claim 10 wherein a sum of the given multimodal injection ratio and of the given multimodal extraction ratio is above 100%.

12. The optical fiber coupler of claim 10 wherein a sum of the given multimodal injection ratio and of the given multimodal extraction ratio is above 150%.

13. The optical fiber coupler of claim 10 wherein both the given multimodal injection ratio and the given multimodal extraction ratio is above 50%.

14. The optical fiber coupler of claim 10 wherein both the given multimodal injection ratio and the given multimodal extraction ratio is above 70%.

15. The optical fiber coupler of claim 10 wherein the coupling region is configured to impede the given multimodal injection ratio to the benefit of the given multimodal extraction ratio.

16. An optical fiber coupler comprising:
a first optical fiber having a longitudinally extending multimode guiding region and a first fiber portion longitudinally extending between a first location and a second location of the first optical fiber;
a second optical fiber having a longitudinally extending multimode guiding region and a second fiber portion longitudinally extending between a third location and a fourth location of the second optical fiber; and
a coupling region where at least a portion of the first fiber portion is optically coupled to at least a portion of the second fiber portion, thereby defining a multimode injection direction extending from the third location of the second optical fiber to the first location of the first optical fiber, and a multimode extraction direction extending from the first location of the first optical fiber to the third location of the second optical fiber;

wherein the coupling region is configured to allow propagation of a multimode signal having substantially fully-filled launching conditions both:

along the multimode injection direction with a given multimodal injection ratio; and along the multimode extraction direction with a given multimodal extraction ratio.

17. The optical fiber coupler of claim 16 wherein a sum of the given multimodal injection ratio and of the given multimodal extraction ratio is above 100%.

18. The optical fiber coupler of claim 16 wherein both the given multimodal injection ratio and the given multimodal extraction ratio is above 50%.

19. The optical fiber coupler of claim 16 wherein the coupling region is configured to impede the given multimodal injection ratio to the benefit of the given multimodal extraction ratio.

20. The optical fiber coupler of claim 10 wherein a sum of the given multimodal injection ratio and of the given multimodal extraction ratio is above 120%.

21. The optical fiber coupler of claim 16 wherein a sum of the given multimodal injection ratio and of the given multimodal extraction ratio is above 120%.

22. The optical fiber coupler of claim 16 wherein a sum of the given multimodal injection ratio and of the given multimodal extraction ratio is above 150%.

23. The optical fiber coupler of claim 16 wherein both the given multimodal injection ratio and the given multimodal extraction ratio is above 70%.

* * * * *